United States Patent
Guiffant et al.

(10) Patent No.: US 6,811,389 B1
(45) Date of Patent: Nov. 2, 2004

(54) THERMAL PROCESSING OVEN IN A BLOW-FORMING FACILITY FOR THERMOPLASTIC RECEPTACLES

(75) Inventors: Alain Guiffant, Le Havre Cedex (FR); Marc Mouchelet, Le Havre Cedex (FR)

(73) Assignee: SIDEL, Le Havre Cedex (FR)

( * ) Notice: Subject to any disclaimer, the term of this patent is extended or adjusted under 35 U.S.C. 154(b) by 0 days.

(21) Appl. No.: 09/959,378

(22) PCT Filed: Apr. 4, 2000

(86) PCT No.: PCT/FR00/00836

§ 371 (c)(1),
(2), (4) Date: Jan. 4, 2002

(87) PCT Pub. No.: WO00/64658

PCT Pub. Date: Nov. 2, 2000

(30) Foreign Application Priority Data

Apr. 26, 1999 (FR) .............................. 99 05336

(51) Int. Cl.[7] .............................................. B29C 49/42
(52) U.S. Cl. ............. 425/526; 425/534; 425/DIG. 108; 198/803.12
(58) Field of Search ................................ 425/526, 534, 425/DIG. 108; 198/470.1, 803.7, 803.8, 803.9, 803.12

(56) References Cited

U.S. PATENT DOCUMENTS 4,086,999 A    5/1978   McDonald
4,116,325 A  *  9/1978  McDonald ............... 198/482.1
4,572,355 A  *  2/1986  Hunter .................. 198/803.12
5,308,233 A  *  5/1994  Denis et al. ................ 425/151

FOREIGN PATENT DOCUMENTS

| DE | 39 16 423 | 11/1990 |
| FR | 2 502 128 | 9/1982 |
| WO | WO 89/00140 | 1/1989 |

* cited by examiner

Primary Examiner—James P. Mackey
Assistant Examiner—Donald Heckenberg
(74) Attorney, Agent, or Firm—Sughrue Mion, PLLC

(57) ABSTRACT

An oven in a production facility for thermoplastic receptacles, including a conveyor chain which is provided with gripping devices (16), whereby each gripping device engages axially with the neck of a receptacle blank in order to transport it into the oven. The gripping devices are displaced axially by a mechanism which is provided with an arm (44) which can move along a path that is substantially parallel to the axial direction ($A_n$) in which gripping takes place and which bears an interface element (40) which is designed to come into contact with the gripping device (30). The interface element (40) is movably mounted on the arm (44) to enable slip-free contact with the gripping device while it is immobilized in relation to the arm according to the axial direction in which gripping occurs.

14 Claims, 7 Drawing Sheets

THERMAL PROCESSING OVEN IN A BLOW-FORMING FACILITY FOR THERMOPLASTIC RECEPTACLES

BACKGROUND OF THE INVENTION

The invention concerns processes for manufacturing hollow bodies from thermoplastic material in which a preform is first produced by injection before obtaining the final container in the course of a process that includes at least one blow-molding step.

The preform obtained by injection generally has a tubular, cylindrical body closed at one of its axial ends and which at its other end is extended by a neck, also tubular. The neck is generally injected so as to already have its final form when the body of the preform is required to undergo relatively substantial deformation to form the final container following the blow-molding operation.

More particularly, these processes concern the manufacture of containers made of polyethylene terephtalate (PET).

There are several variations of the procedures in this family. Depending on the process used, the corresponding manufacturing facility has one or more temperature condition ovens.

In all of the processes concerned, the blow-molding operation of the body of the preform requires that said preform be brought to a temperature that is higher than the glass transition temperature of the material. To that end, the preform is temperature conditioned by circulating it inside an oven. The oven has heating means which are, for example, comprised of infrared lamps in front of which the preform is moved by a conveyor device. Advantageously, provision is made so that the preform rotates while it is moving through the oven.

The preforms are generally held on the conveyor device by a gripping device formed by a mandrel that is engaged inside the neck of the preform and which holds it by tightening against the inner face of the neck. However, in some cases the preform is held by the outer face of the neck.

In some of these processes, the temperature resistance of the body of the final container is increased by increasing the rate of crystallinity of the PET. This is achieved by first putting the preform through a first blow-molding stage to obtain an intermediate container that is subjected to a heating stage in a temperature condition oven, during which stage it shrinks. This shrunk container undergoes a second blow-molding stage which gives the container its final form.

In other processes, it is the neck of the preform, of the final container or of an intermediate container, that is heated to increase the crystallinity. To that end, the facility has a suitable temperature condition oven.

In all of these cases, it can be seen that facilities that manufacture containers from thermoplastic material can have several types of temperature condition ovens, which ovens, of course, are suitable for the heat treatment to be carried out. However, all of these ovens may have the same type of conveyor system.

These different ovens, therefore, are intended to process objects in different phases of producing the final container. However, they are all intended to grip this object by the neck, which does not undergo any fundamental variation in its geometry, even if some processes result in a modification of the structure of the material of which the neck is composed. Also, in the text that follows the terms preform, blank or bottle are used indiscriminately to designate the object to be processed in the oven.

According to a known technique, the conveyor system can, for example, be comprised of a chain of conveyor links intended to carry a preform or a blank of the container in order to move it around a circuit inside the oven. This chain is driven in continuous movement.

To pick up the preform, a conveyor link has a gripping device that is axially movable with respect to the link and which, when it is taken from an extreme release position to an extreme gripping position, is axially engaged on the neck of the blank.

Different means are known for controlling the movements of the gripping devices between their released and gripping positions. Thus, in general a system of cams and cam followers is used to take advantage of the fact that, in general, the movement of the gripping devices is perpendicular to that of the conveyor chain. In a conventional manner, each gripping device is equipped with a roller which is intended to cooperate with sloping ramps that are integral with the infrastructure of the oven to cause the gripping device to raise or lower to the level of the preform loading or unloading stations.

However, in some cases the means for controlling the cams is not entirely satisfactory. This is especially the case when the gripping device has a mandrel that is intended to be inserted and very tightly secured inside the neck of the preform.

The loading and unloading of the preform, then, requires a relatively sizeable force applied along the axis of the gripping device. With a system of cams, such axial force becomes even greater, exerted on the conveyor chain in the direction of movement of said conveyor. Thus, each time a roller comes into contact with a cam, the chain jerks. This is harmful, first to the proper synchronization between the chain and the other components of the blow-molding facility, and second, to the working life of the conveyor system. This jerk becomes greater as the speed of movement of the gripping device increase, because then a cam with a steep slope will have to be used. In addition, in this case, the contact pressure between the roller and the cam becomes heavy to the point of threatening the working life of these two elements.

Moreover, in known embodiments, the roller is offset with respect to the axis of movement of the gripping device. Also, when the loading or unloading effort is large, the roller causes a sizeable rotational torque on the corresponding link of the chain, which can be the source of premature wear of the conveyor system.

A purpose of the invention, therefore, is to propose new means of controlling the movements of the gripping devices that make it possible to limit the forces on the conveyor chain even when the force in loading and unloading the preform is large.

SUMMARY OF THE INVENTION

To that end, the invention proposes a temperature condition oven for a blow-molding facility for producing containers of thermoplastic material, of the type with a conveyor chain of links having gripping devices each of which is intended to carry a blank of the container in order to move it around a circuit inside the oven, of the type in which the chain is driven in continuous movement along its circuit, of the type in which each gripping device is axially movable with respect to the link that carries it so that when it is taken from an extreme release position to an extreme gripping position it engages axially on the neck of the blank, and of the type in which it is provided with means to control the movements of the gripping devices between their release and gripping positions, characterized in that the means for controlling the movements of the gripping devices comprise at least one mechanism provided with an arm that is movable along a trajectory that is essentially parallel to the axial direction of gripping and which carries an interface device intended to come into contact with the gripping device, and in that the interface device is movably mounted on the arm in such a way as to allow non-slip contact with the gripping device while being immobilized with respect to the arm along the axial direction of gripping.

According to other characteristics of the invention:

the arm is controlled in its trajectory along a movement that alternates between an initial position and a final position; and, for a position of contact of the arm that falls between its initial and final positions, the interface device comes into contact with the gripping device which is in one of its extreme positions and forces it towards the other of its extreme positions, which position corresponds to the final position of the arm;

the interface device is mounted on the arm so that it is movable in a direction parallel to the movement of the links of the chain;

the interface device is elastically drawn back to a rest position with respect to the arm, and as a result of the movement of the corresponding chain link between the moment the arm comes into contact with the interface device and the moment the arm reaches its final position, the interface device is moved away from its rest position by the gripping device with which it is in contact;

between the contact position and the final position of the arm, the gripping device cooperates by adherence to the interface device to move it away from its rest position with respect to the arm;

during the return movement of the arm from its final position to its initial position, the interface device is drawn back to its rest position by elastic means;

the interface device is mounted on the arm slideably in the direction of movement of the links of the chain;

the interface device is comprised of at least one roller which is mounted on the arm rotatably around an axis perpendicular to the axial direction of gripping and to the direction of the movement of the links of the chain;

between the moment the interface device comes into contact with the gripping device and the moment the arm reaches its final position, the gripping device cooperates by adherence to the interface device to drive the roller in rotation around its axis;

the gripping device has a rod one central section of which is axially guided in the corresponding link and the two opposite ends of which cooperate respectively with the blank and with the mechanism, the mechanism exerting a pushing force on the rod, and the interface device cooperates by pressing against one surface of the rod that is essentially flat and perpendicular to the axial direction;

the gripping device has a rod one central section of which is axially guided in the corresponding link and the two opposite ends of which cooperate respectively with the device and with the mechanism, the mechanism exerts a pulling force on the rod, the interface device has the shape of a U-section having two parallel limbs, the ends of which are turned inward to delimit an aperture allowing the rod to pass through, the rod of the gripping devices has a control head which is intended to move between the two limbs of the U-section and which has a width that is greater than the width of the aperture in such a way that when the interface device is moved axially by the arm, the turned ends of the U-section cooperate with the head to control the axial movement of the gripping device;

the gripping device has a rod one central section of which is axially guided in the corresponding link and the two opposite ends of which cooperate respectively with the blank and with the mechanism, the mechanism exerts a pulling force on the rod; the arm has the shape of a U-section having two parallel limbs, the ends of which are turned inward to delimit an aperture allowing the passage of the rod; each of the two turned ends has at least a roller; the rod of the gripping devices carries a control head that is intended to move between the two limbs of the U-section and which has a width that is greater than the width of the aperture in such a way that when the arm is moved axially, the rollers of the turned ends of the U-section cooperate with the head to control the axial movement of the gripping device;

the alternating movement of the arm is controlled by a connecting rod and crank system; and the means for controlling the movements of the gripping means comprise two mechanisms, one of which controls the movement of the gripping devices from their extreme release position to their extreme grip position, and the other controls the reverse movement.

BRIEF DESCRIPTION OF THE DRAWINGS

Other characteristics and advantages of the invention will appear from the detailed description that follows, as well as in the appended drawings in which.

DETAILED DESCRIPTION OF EXEMPLARY EMBODIMENTS

The invention will now be described in the particular case of a temperature condition oven for a preform 10 made of thermoplastic material, for example PET. The preform 10 is produced by injection molding and it has a neck 12 which is formed directly in its final form, the neck having an external radial flange 14. For reasons of clarity of the description, in all of the text hereinafter the preform 10 will be considered to be arranged vertically, neck upward, as illustrated for example in FIGS. 1 and 2. The geometric terms used to describe the invention are the result of this convention and should not be considered to be limitations to the scope of the invention.

Figure 1:
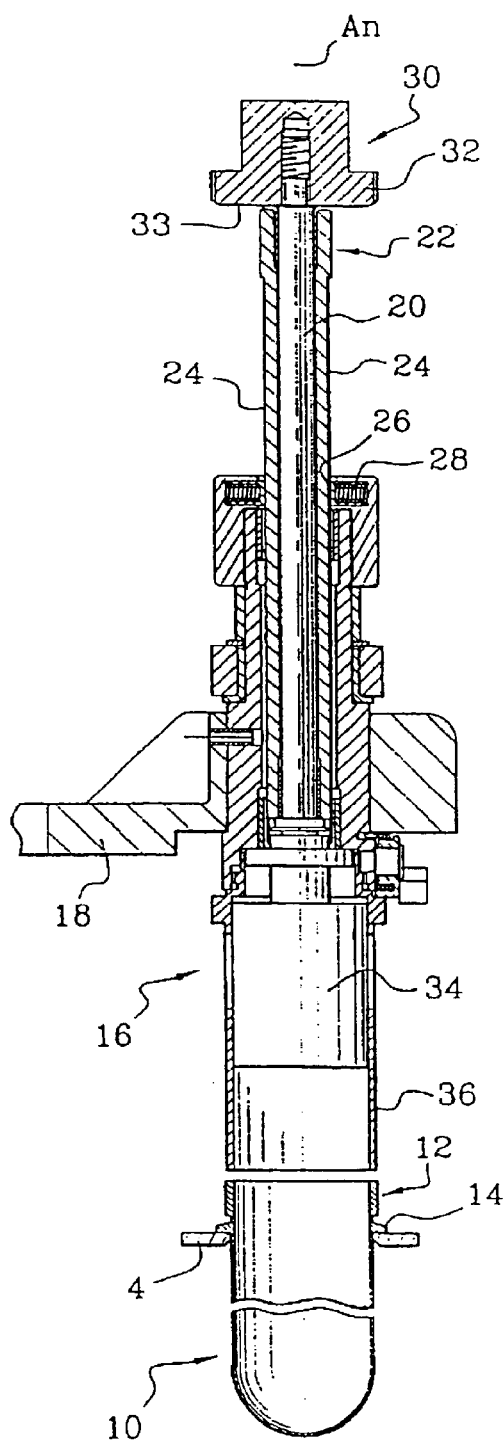
FIGS. 1 and 2 are axial cross sectional views that illustrate the gripping device of one link of the conveyor chain, this device being illustrated respectively in one high released position and in one low position gripping a preform.
Figure 2:
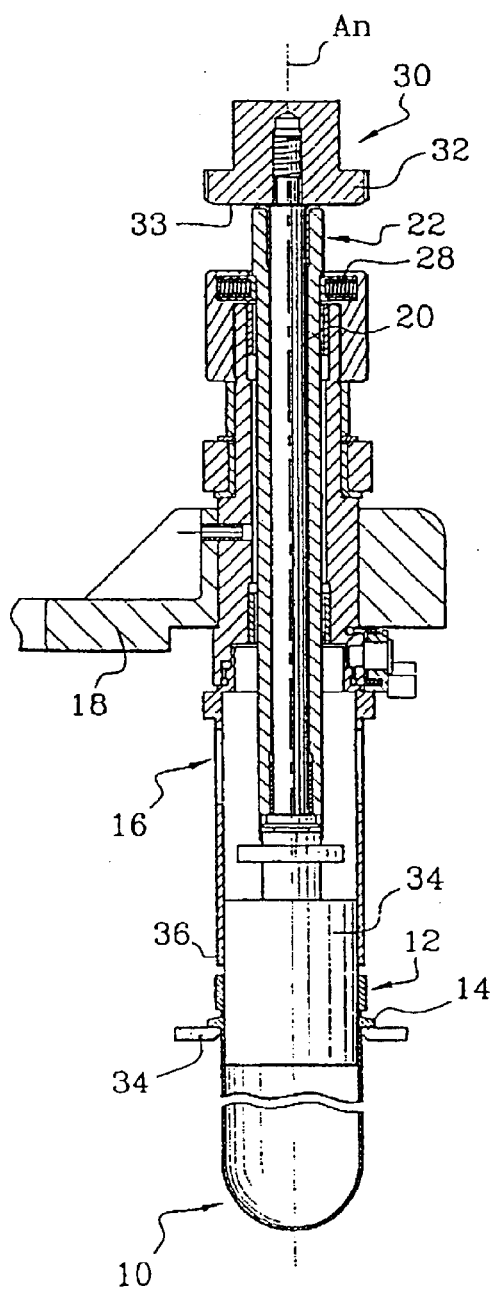

FIGS. 1 and 2 illustrate partially and diagrammatically the gripping device 16 of a conveyor link the principal body 18 of which is only illustrated very partially. The principal body 18 is intended to be connected to two other similar links by being articulated with respect to them around a vertical axis to form a part of a conveyor chain for preforms in the oven. In this example, the chain moves essentially in a horizontal plane. However, the conveyor links and their linkages can be done differently without going beyond the scope of the invention. They can even be independent of each other, provided, however, that they have synchronized drive means so that two links are separated at the same rate, at least in the area where the preform is gripped.

The gripping device 16 has a cylindrical rod 20 with a vertical axis $A_n$ which is rotatably mounted around its axis in a sleeve 22 which itself is slidably mounted in the main body 18 along the axis $A_n$. The rod 20 and the sleeve 22 are axially integrated with each other in such a way that the gripping device 16 can slide between two extreme positions, that is, an upper released position, illustrated in FIG. 1, and a lower gripping position illustrated in FIG. 2.

The sleeve 22, which is generally cylindrical in shape, has two lateral flats 24 that extend axially along the length of travel of the gripping device and which are diametrically opposed. The link has friction pads 26 that are radially applied in support by springs 28 against the flats 24 in order to maintain by braking the axial position of the sleeve 22, and thus the gripping device 16.

At its upper end, the rod 20 has a control head 30 that is generally cylindrical in shape. At its base, the head 30 has a gear wheel 32 the diameter of which is greater than that of the sleeve 22 in order to cooperate with a fixed rack (not represented) of the oven in order to cause the rotation of the rod 20 around its axis $A_n$ when the conveyor link moves in the oven.

At its lower end, the rod 20 has a gripping mandrel 34 which has a shape suitable for the neck 12 of the preform 10. The mandrel 34 represented here has an essentially cylindrical shape, but in practice its shape can be more complex. Of course, should it be desired to pick up the preform by the outside of the neck, the mandrel 34 would be replaced for example by a bell-shaped gripper.

In order to perform the gripping of the preform 10 at the entrance to the oven, the mandrel 34 should be axially engaged downward inside the neck 12 of the preform 10, which is achieved by moving a gripping device 16 assembly from its upper position to its lower position.

The mandrel is received and tightened in the neck, which means that the engagement requires a certain force along the direction of the axis $A_n$. This force is primarily dependent on the degree of tightening, and as an example it can reach about 150 daN in certain applications. It will be noted that the recovery from the axial gripping force by the preform is done, for example, by support of its flange 14 on a support surface 4 as part of the conveyor link.

Once engaged in the neck 12, the mandrel 34 can then carry the preform 10 and can also rotate it around its axis $A_n$.

Upon exiting the oven, the mandrel 34 must be axially disengaged upward to release the preform 10. Since the mandrel tends to carry the preform 10 upward with it, ejection means must be provided that prevents it from moving upward. To that end, the conveyor link has a tubular ejector 36 with axis $A_n$ which is integral with the main body 18 of the link and the inside diameter of which is essentially equal to the inside diameter of the neck 12 of the preform 10.

In the released position, the mandrel 34 is received inside the ejector 36, while in the lower position, the mandrel 34 passes below the lower end of the ejector 36. This ejector is arranged in such a way that its lower edge is situated just above the upper edge of the neck of the preform 10.

Also, when the preform 10 is lifted up by the mandrel 34, it is blocked against the ejector 36. The mandrel 34 continues upward and ends by completely disengaging from the neck 12 of the preform, and the preform is thus released. Of course, the ejector could also be supported against the flange 14.

More particularly, the invention concerns the means that make it possible to control the gripping device 16 between its upper and lower positions.

More precisely, the oven according to the invention has means at the entrance of the oven that make it possible to control the gripping device 16 from its upper position to its lower position in order to control the gripping of the preform, and upon exiting from the oven, means that allow it to return from its lower position to its upper position. These two means are very similar and have two identical mechanisms 38 on which a specific tool is adapted for controlling the raising or lowering.

Figure 3:
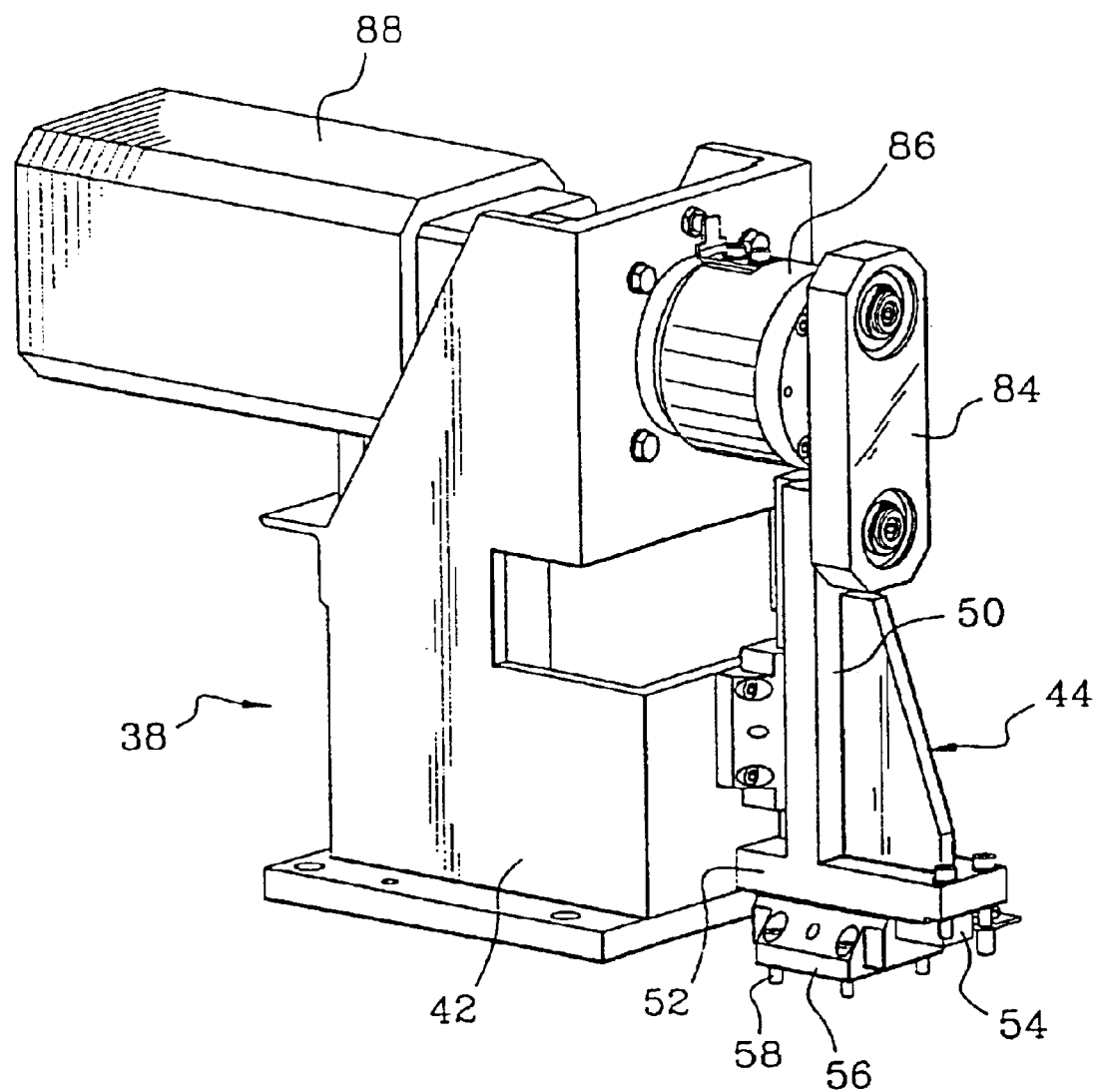
FIG. 3 is a perspective view illustrating one embodiment of a mechanism to control the movements of the gripping device.
Figure 4:
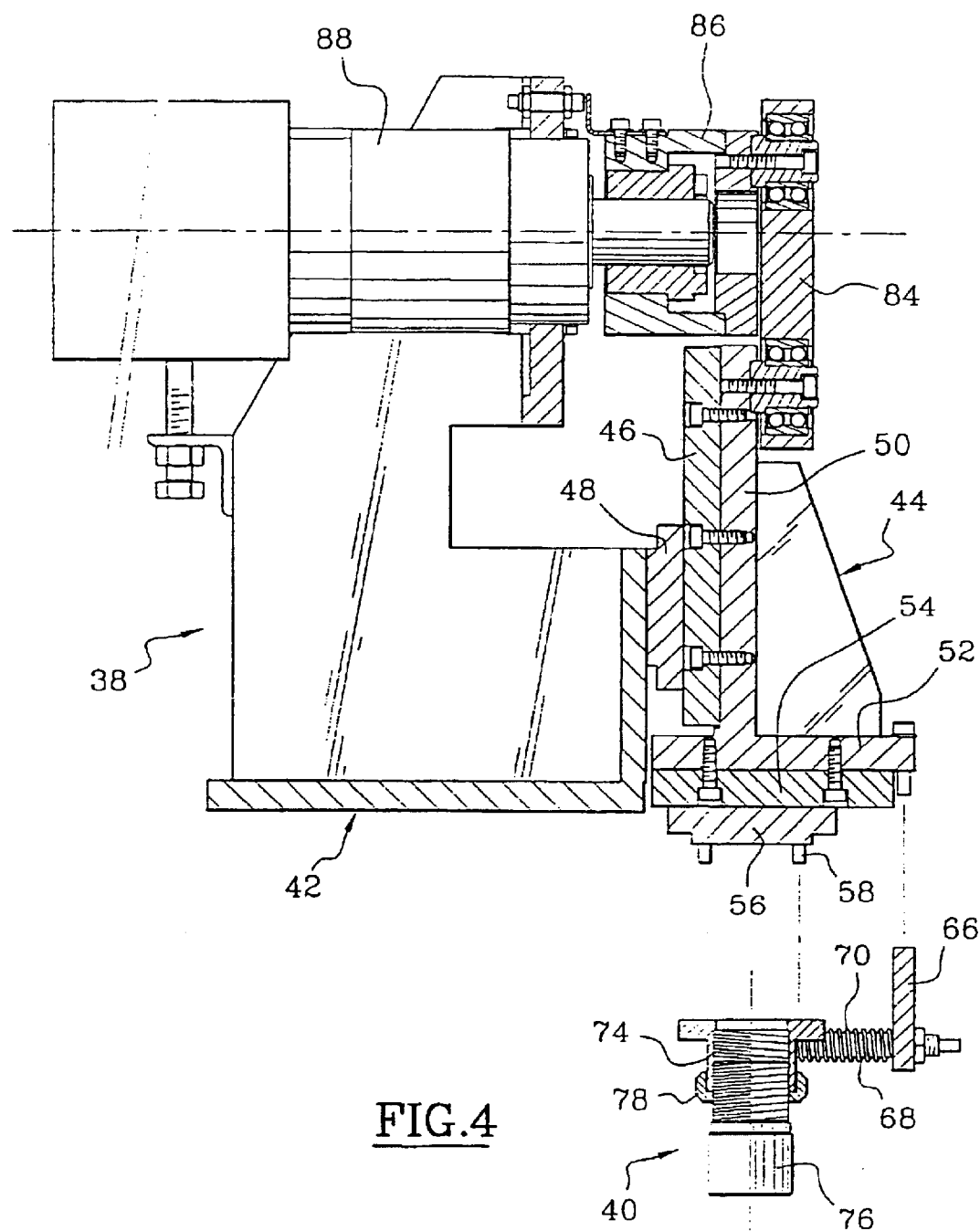
FIG. 4 is a cross sectional view of the control means illustrated in FIG. 3, providing additional illustration of the versatile tool on this mechanism to control the movement of the gripping device from its upper to its lower position, this tool being more particularly illustrated in perspective in FIG. 5.

The common mechanism 38 is illustrated in perspective in FIG. 3 and in cross section in FIG. 4. In FIG. 4, also illustrated is a push tool 40 specific to controlling the descent in order to ensure the gripping of the preform 10.

The mechanism 38 has a frame 42 which is intended to be attached to the body of the oven. On this frame 42, a bracket shaped arm 44 is mounted so as to be able to slide along the gripping direction, that is, in this instance in the vertical direction. To do this, a sliding connection is used formed by a vertical rail 46 integral with a vertical upright 50 of the bracket 44, and by a slide 48 attached to the frame 42.

The mechanism has means to cause an alternating movement of the bracket 44 along the axial direction of gripping. In the proposed example, a system of a connecting rod 84 and crank 86 is used, driven by a rotary electric motor 88 in the horizontal axis. Of course, any other known means to produce an alternating axial movement of the bracket 44 can be used. Thus, the movements of the bracket could be controlled by an actuator.

At the lower end of its vertical upright 50, the bracket-shaped arm 44 has a horizontal lower plate 52 on the lower face of which is attached a horizontal rail 54 comprising part of a second sliding connection. A movable slide 56 is mounted on the horizontal rail 54 so as to be able to slide with respect to the bracket 44 along a horizontal direction which is therefore perpendicular to the vertical direction of gripping of the preform and which corresponds to the direction of movement of the preform conveyor chain.

Figure 5:
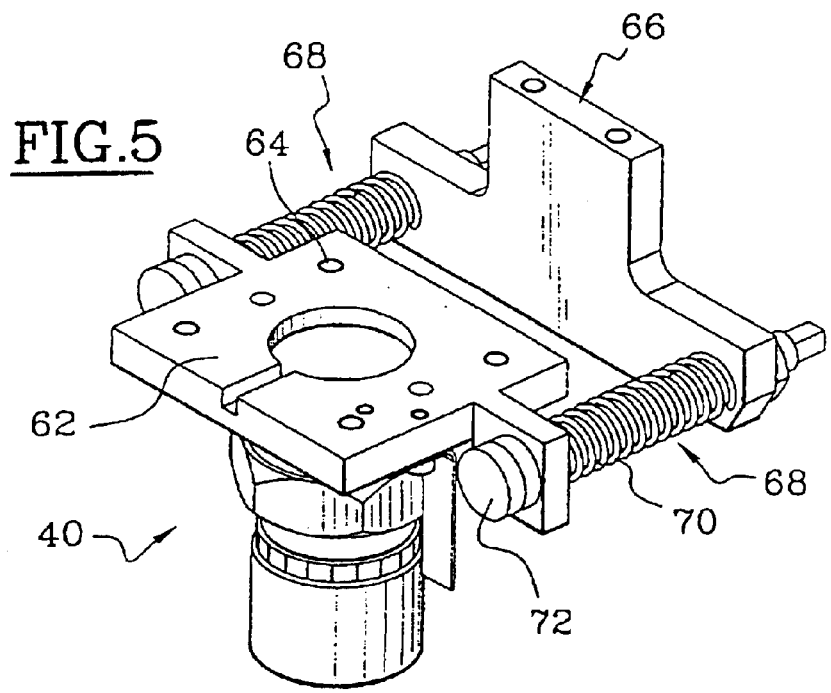
Figure 6:
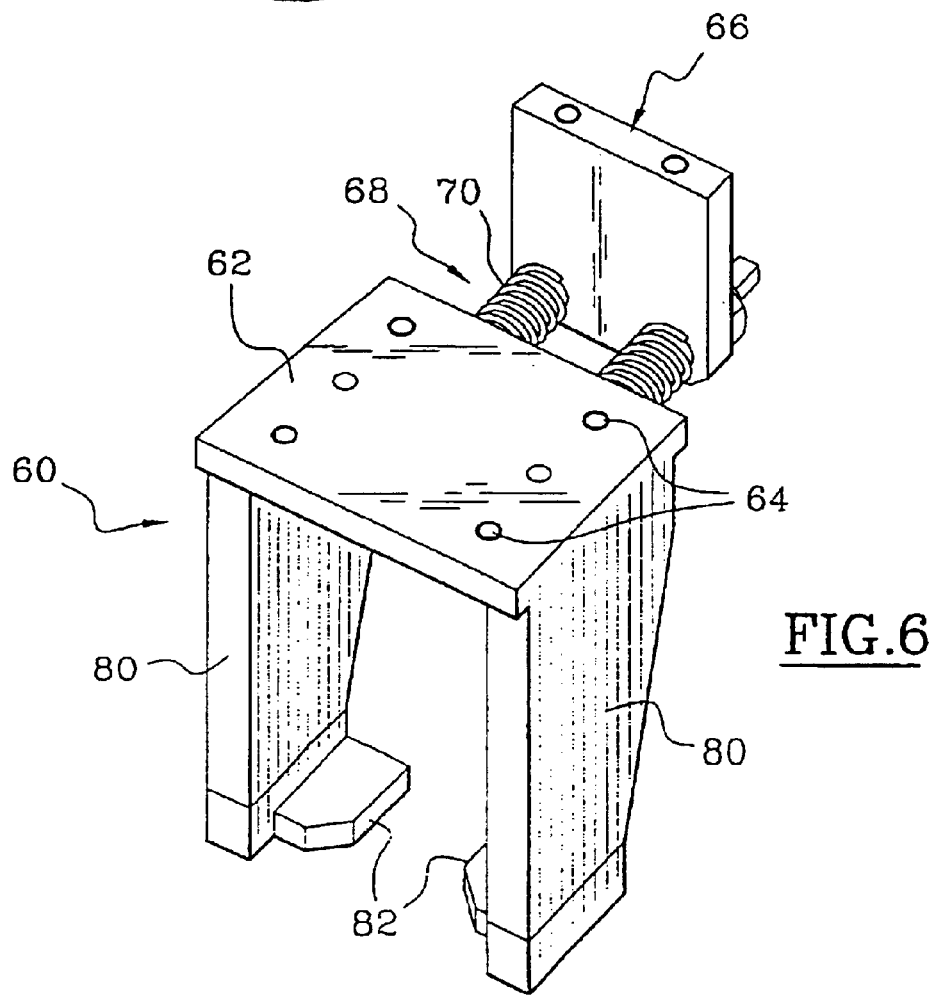
FIG. 6 illustrates, in perspective, a versatile tool on the control mechanism to return the gripping device from its lower to its upper position.

The movable slide 56 is intended to carry one or the other of the two specific tools 40, 60, illustrated in more detail in FIGS. 5 and 6, respectively.

Each of these two tools 40, 60 comprises an upper plate 62 which is provided with indexing orifices 64 intended to receive indexing studs 58 extending axially downward from the movable slide 56. The plate 62 is attached to the slide 56, for example, by two screws (not shown).

Each of the two tools 40, 60 also has a support plate 66 which extends in a vertical plane perpendicular to the sliding direction of the movable slide 56 and which is intended to be attached directly to the lower plate 52 of the bracket 44, the support plate 66 of each tool to carries two parallel guides 68 which extend in the sliding direction of the movable slide 56 and each of which is slidably received through a guide hole made in the plate 62. The guides 68 serve to support helicoidal compression springs 70 which are placed between the plate 62 and the support plate 66 to separate them. The free end of the guides 68 has a bulge against which the plate 62 is pressed by the action of the springs 70.

Thus, when one or the other of the two tools 40, 60 is mounted on the movable slide 56, the plate 62 can slide along the horizontal direction with respect to the bracket 44. However, under the action of the springs 70, it is returned to a rest position in which it is stopped against the bulges 72 of the guides 68.

Illustrated in FIGS. 4 and 5 is the push tool 40 intended to control the downward movement of a gripping device 16 simply by supporting on the upper face the control head 30 of said gripping device. The push tool 40 has a tubular stem 74 which extends axially downward from the plate 62 and which has fine pitch threads on its internal face to allow the attachment and precise axial positioning of a cylindrical stud 76 the lower face of which is intended to contact the control head 30 to cause it to descend. A lock nut 78 allows the stud 76 to be secured on the stem 74 to prevent any maladjustment of its axial position.

The fork tool 60 illustrated in FIG. 6 has two legs 80 in the form of parallel plates that extend vertically downward from the plate 62. Each leg 80 has, at its lower end, a transversal internal flange 82 that extends toward the other leg. The transverse separation and the height of the legs 80 are greater than the corresponding dimensions of the control head 30 so that said head can move between the two legs. However, the transverse separation of the two flanges is greater than the diameter of the sleeve 22 but less than that of the gear wheel 32 so that, when the head 30 is received between the two legs 80 and the fork tool 60 is moved upward, the flanges 82 cooperate with the lower face 33 of the head 30 to draw it upward.

The diagrams in FIGS. 7A to 7D illustrate the operation of the control means according to the invention in the case of gripping the preform. In these diagrams, the control head 30 of two successive links of the conveyor chain is represented. The axes of the gripping devices of these two links are, respectively, $A_n$ and $A_{n+1}$.

Figure 7:
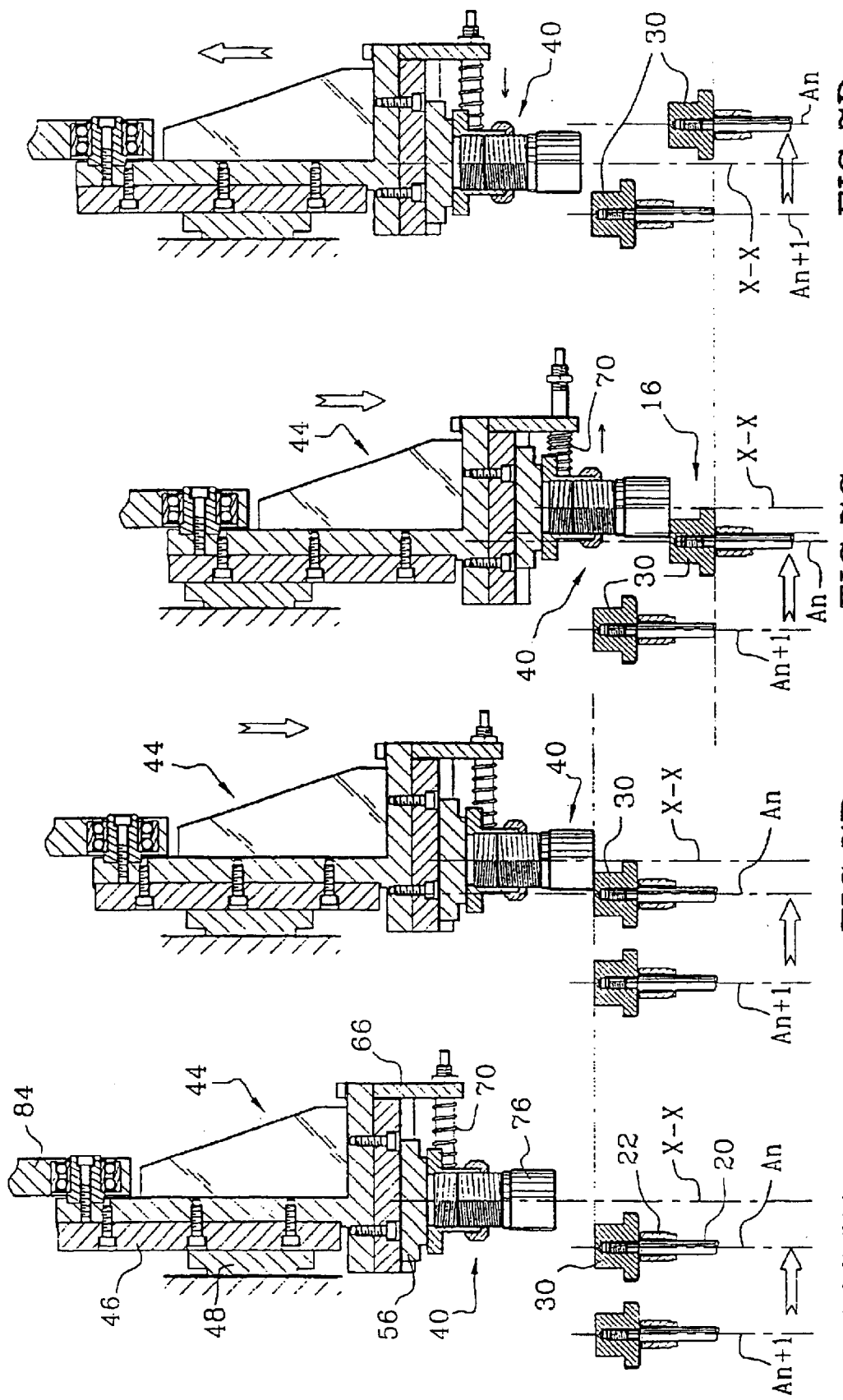
FIGS. 7A to 7D illustrate, diagrammatically in axial cross section, an operation allowing the gripping of the preform.

At the stage illustrated in FIG. 7A, the bracket 44 is in an initial upper position and it can be seen that the control head 30 of one of the links is approaching in the direction of movement of the conveyor chain, that is, from left to right in the figures. The lower face of the stud 76 of the push tool is then situated higher than the control head 30.

At that moment, the connecting rod and crank system causes the bracket shaped arm 44 to begin to descend. The push tool 40 is then in the rest position with respect to the bracket, that is, held to the left by the springs 70.

At stage 7B, the link of the conveyor chain is seen to have moved in line with the push tool 40. This moment corresponds essentially with the moment at which the lower face of the push tool 40 comes in contact with the control head 30. In reality, it can be seen that the push tool 40 and the control head 30, although they are essentially of the same diameter, only cooperate by half of their respective surfaces because contact occurs before their axes $A_n$ and X-X coincide. It will be noted that the push tool 40 is still in the rest position with respect to the bracket 44.

At this moment, with the downward movement of the bracket 44 continuing, the push tool exerts a downward pressure on the control head, which allows the gripper mandrel 34 to penetrate inside the neck 12 of the preform. However, all during the downward movement of the push tool 40 and of the control head 30, the latter continues to move with the link of the conveyor chain in the horizontal direction, while the bracket 44 can not move in that direction. Also, as can be seen in FIG. 7C, the push tool 40 is then horizontally separated from its rest position by the head 30 by the sliding of the movable slide 56 with respect to the bracket 44 by compressing the springs 70.

In the proposed example, this actuation of the push tool 40 is the result of simple adherence of the lower face of the push tool 40 on the head 30, with no slippage on one with respect to the other, this adherence being the result of the axial gripping effort necessary to allow the engagement of the mandrel 34 in the neck of the preform.

When the bracket 44 has reached its final lower position, the connecting rod and crank system then begins the movement back upwards. The contact between the push tool 40 and the control head 30 is then broken so that the latter, braked by the pads 26, has reached its extreme lower position of gripping the preform. It will be noted, then, that the extreme lower position of the gripping device 16 is determined by the final lower position of the push tool 40. Having a push tool in two parts, in which the position of the cylindrical stud 76 can be adjusted with respect to the plate 62, makes it possible to define precisely the extreme lower position of the gripping device 16, as well as to define precisely the distance at which the mandrel 34 is engaged in the neck of the preform.

Moreover, as can be seen in FIG. 7D, as soon as contact with the control head is broken, the springs 70 force the push tool 40 back to its rest position with respect to the bracket 44. Thus the mechanism returns to its initial configuration. In addition, it can be seen that the control head 30 of the next link then arrives in position to be, in its turn, moved downward by the push tool 40.

In a similar way, FIGS. 8A to 8D illustrate the operation of the control means at the moment the preform is released.

Figure 8:
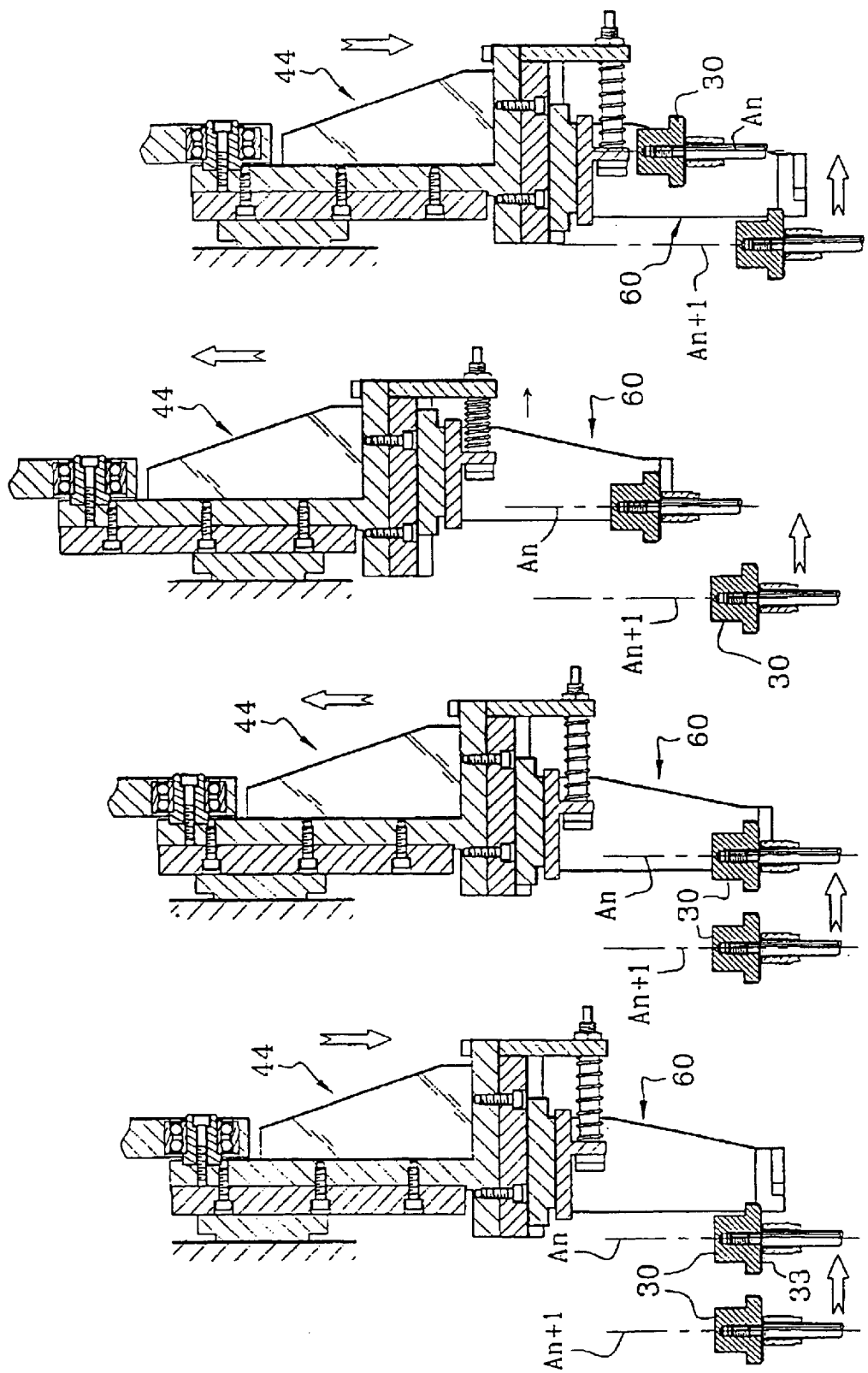
FIGS. 8A to 8D illustrate in the same way an operation allowing the release of the preform.

In FIG. 8A, the mechanism is illustrated in its initial lower position, before the control head 30 of the first of the two links arrives at the fork tool 60. It will be noted that the flanges 82 of the legs are then situated below the lower face 33 of the head 30 which is in its extreme lower position. In this way, the head 30 can then be engaged between the legs 80 as a result of the movement of the conveyor chain.

Illustrated in FIG. 8B is the contact position of the bracket 44 for which the flanges 82 come into contact with the head 30 during their upward movement. Here again the contact occurs before the head is exactly in line with the fork tool 60.

In FIG. 8C, the bracket 44 has reached its final upper position, causing the head 30 to move to its extreme upper position. At the same time, because of the effort required to extract the mandrel 34, the head 30 causes the fork tool 60 to move horizontally with respect to the bracket 44 by compressing the springs 70.

At that moment, the connecting rod and crank system causes the bracket 44 to descend again and thus break contact with the flanges 82 of the head 30, which remains in the upper position due to the pads 26. However, the springs 70 then return the fork tool 60 to its rest position. In spite of this, the fork tool can return to its initial lower position before the next control head, with axis $A_{n+1}$, comes into position of contact.

In the proposed example, the electric motor 88 turns at a constant speed so that the raising and lowering times of the tools 40, 60 are identical. However, it could be provided that the motor be controlled so that one of the two movements, up or down, is faster than the other, for example in order to avoid any risk of interference of the tool with the next head during the return movement. This possibility could also be used to obtain a predetermined speed of movement of the gripping device, independent of the speed of movement of the conveyor chain, which is linked, for example, to the production rate of the blow-molding machine associated with the oven.

Figure 9:
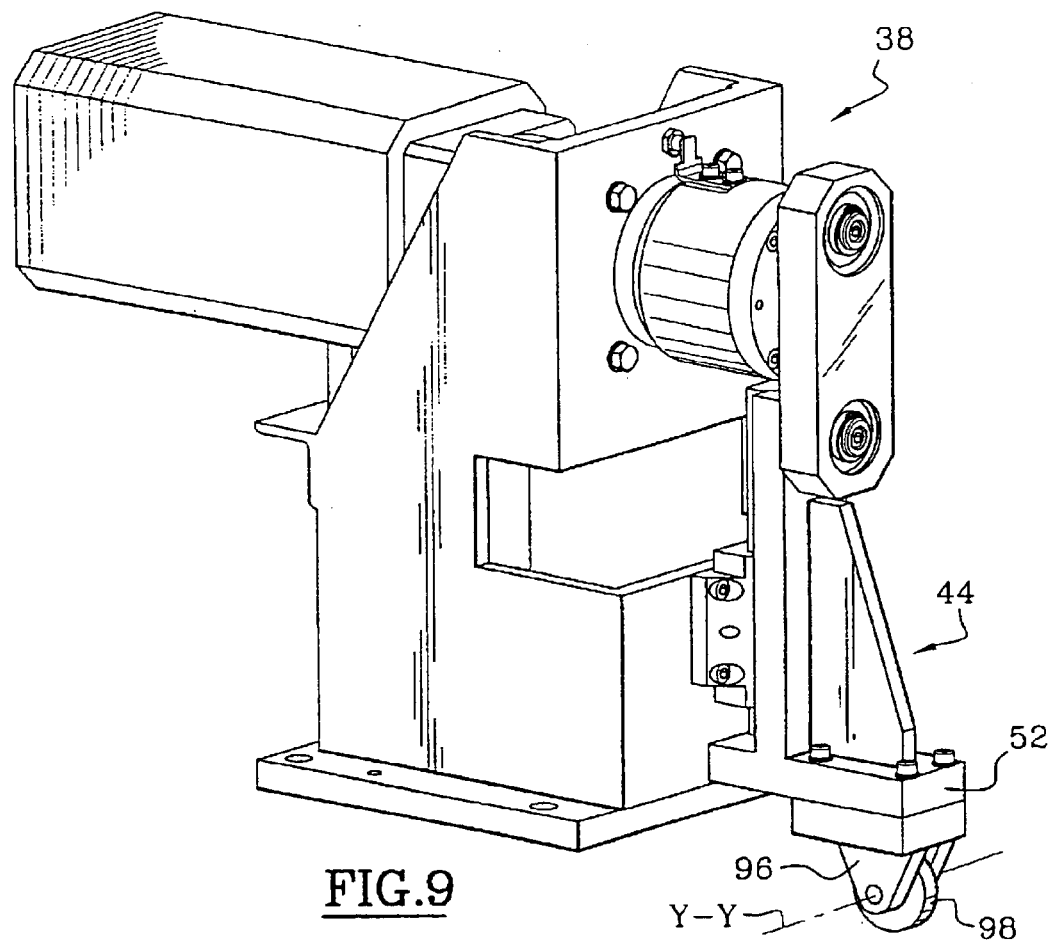
FIGS. 9 and 10 are views similar to those of FIG. 3 illustrating variations of embodiment of the invention.
Figure 10:
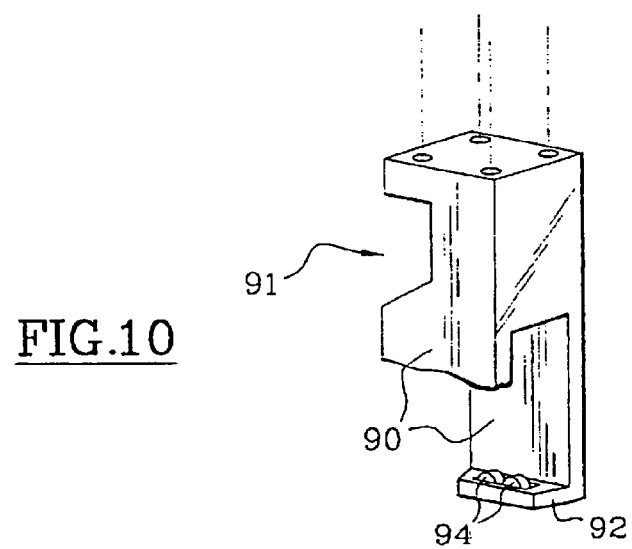

FIGS. 9 and 10 illustrate two mechanisms according to the principles of the invention but in which the interface devices by which the mechanism acts on the head 30 of the rod 20 are not slidably mounted on the arm 44, but are comprised of at least one roller rotatably mounted on the arm 44 around a horizontal axis so as to be able to roll on the head 30 of the rod 20.

In FIG. 9, it can be seen that under the lower plate 52 of the arm 44, a tool has been mounted to control the gripping device 16 from its upper position to its lower position. This tool comprises a single roller 98 rotatably mounted in a fork joint 96 around a horizontal axis Y-Y which in turn is perpendicular to the axial direction of gripping and to the direction of movement of the conveyor chain. The fork joint 96 is rigidly attached beneath the lower plate 52.

In this way, when the arm 44 is moved from its upper position to its lower position, the roller 98 comes into contact against the control head 30. Once in contact, the roller 98 can push the rod 20 downward. At the same time, because of the movement of the link 18, the roller 98 rolls on the head 30 without inducing any parasitic force on the link.

In FIG. 10, a tool 91 is represented that is intended to be attached directly beneath the lower plate 52 of the arm 44 to provide the raising of the gripping device to its upper position. This tool 91 has a shape similar to that of the fork tool 60 described above, and it therefore has two parallel legs 90, each of which has at its lower end an internal transverse flange 92.

However, in this embodiment of the invention, the tool 91 is fixed with respect to the arm 44 but the flanges 92 of the legs 90 are each fitted with two rollers 94 which are mounted rotatably around their axes, which in turn are perpendicular to the axial direction of gripping and to the direction of movement of the conveyor chain. These rollers 94, which extend above the upper face of the flanges 92, are intended to come in contact with the lower face 33 of the head 30.

Thus, when the arm 44 causes a gripping device to rise, the rollers 94 allow the head 30 to move with respect to the arm 44 in the direction of movement of the conveyor chain without this relative movement introducing any effort opposing the movement of the chain because the contact between the rollers 94 and the head 30 is rolling and not sliding.

As can be seen, the mechanism according to the invention allows the gripping device of each mechanism to be controlled quickly, with considerable force, and without introducing parasitic effort on the conveyor chain.

What is claimed is:

1. A temperature condition oven for a blow-molding facility for producing containers of thermoplastic material, comprising:

a conveyor chain of links having gripping devices each of which is intended to carry a blank of the container to move it around a circuit inside the oven, with the chain being driven in continuous movement along its circuit, wherein each gripping device is axially movable with respect to the link that carries it so that when it is taken from an extreme release position to an extreme gripping position it engages axially on the neck of the blank, the oven further comprising means for controlling the movements of the gripping devices between their release and gripping positions, wherein the means for controlling the movements of the gripping devices comprises at least one mechanism provided with an arm that is movable along a trajectory that is essentially parallel to the axial direction of gripping and which carries an interface device that comes into contact with the gripping device, with the interface device movably mounted on the arm in such a way as to allow non-slip contact with the gripping device while being immobilized with respect to the arm along the axial direction of gripping.

2. The oven according to claim 1, wherein the arm is controlled in its trajectory along a movement that alternates between an initial position and a final position and, for a position of contact of the arm that falls between its initial and final positions, the interface device comes into contact with the gripping device which is in one of its extreme positions and forces it towards the other of its extreme positions, which position corresponds to the final position of the arm.

3. The oven according to claim 1, wherein the interface device is mounted on the arm so that it is movable in a direction parallel to the movement of the links of the chain.

4. The oven according to claim 3, wherein the interface device is elastically drawn back to a rest position with respect to the arm, and as a result of the movement of the corresponding chain link between the moment the arm comes into contact with the interface device and the moment the arm reaches its final position, the interface device is moved away from its rest position by the gripping device with which it is in contact.

5. The oven according to claim 4, wherein between the contact position and the final position of the arm, the gripping device cooperates by adherence to the interface device to move it away from its rest position with respect to the arm.

6. The oven according to claim 4, wherein, during the return movement of the arm from its final position to its initial position, the interface device is drawn back to its rest position by elastic means.

7. The oven according to claim 3, wherein the interface device is mounted on the arm slideably in the direction of movement of the links of the chain.

8. The oven according to claim 1, wherein the interface device is comprised of at least one roller which is mounted on the arm rotatably around an axis perpendicular to the axial direction of gripping and to the direction of the movement of the links of the chain.

9. The oven according to claim 8, wherein, between the moment the interface device comes into contact with the gripping device and the moment the arm reaches its final position, the gripping device cooperates by adherence to the interface device to drive the roller in rotation around its axis.

10. The oven according to claim 1, wherein the gripping device has a rod one central section of which is axially guided in the corresponding link and the two opposite ends of which cooperate respectively with the blank and with the mechanism, wherein the mechanism exerts a pushing force on the rod, and further wherein the interface device cooperates by pressing against one surface of the rod that is essentially flat and perpendicular to the axial direction.

11. The oven according to claim 3, wherein the gripping device has a rod one central section of which is axially guided in the corresponding link and the two opposite ends of which cooperate respectively with the blank and with the mechanism, wherein the mechanism exerts a pulling force on the rod, wherein the interface device has the shape of a U-section having two parallel limbs the ends of which are turned inward to delimit an aperture allowing the rod to pass through, and further wherein the rod of the gripping devices has a control head which is intended to move between the two limbs of the U-section and which has a width that is greater than the width of the aperture in such a way that when the interface device is moved axially by the arm, the turned ends of the U-section cooperate with the head to control the axial movement of the gripping device.

12. The oven according to claim 8, wherein the gripping device has a rod one central section of which is axially guided in the corresponding link and the two opposite ends of which cooperate respectively with the blank and with the mechanism, wherein the mechanism exerts a pulling force on the rod, wherein the arm has the shape of a U-section having two parallel limbs the ends of which are turned inward to delimit an aperture allowing the passage of the rod, wherein each of the two turned ends has at least one roller (94), and further wherein the rod of the gripping devices carries a control head that is intended to move between the two limbs of the U-section and which has a width that is greater than the width of the aperture in such a way that when the arm is moved axially, the rollers of the turned ends of the U-section cooperate with the head to control the axial movement of the gripping device.

13. The oven according to claim 1, wherein the alternating movement of the arm is controlled by a connecting rod and crank system.

14. The oven according to claim 1, wherein the means for controlling the movements of the gripping means comprise two mechanisms, one of which controls the movement of the gripping devices from their extreme release position to their extreme grip position, and the other controls the reverse movement.

* * * * *